US012158265B2

(12) United States Patent
Dennis et al.

(10) Patent No.: US 12,158,265 B2
(45) Date of Patent: Dec. 3, 2024

(54) BURNERS FOR USE IN PRODUCING SYNTHESIS GAS

(71) Applicant: Board of Regents of The University of Texas System, Austin, TX (US)

(72) Inventors: Brian H. Dennis, Austin, TX (US); Frederick M. MacDonnell, Austin, TX (US)

(73) Assignee: Board of Regents of The University of Texas System, Austin, TX (US)

( * ) Notice: Subject to any disclaimer, the term of this patent is extended or adjusted under 35 U.S.C. 154(b) by 750 days.

(21) Appl. No.: 17/290,555

(22) PCT Filed: Oct. 30, 2019

(86) PCT No.: PCT/US2019/058899
§ 371 (c)(1),
(2) Date: Apr. 30, 2021

(87) PCT Pub. No.: WO2020/092595
PCT Pub. Date: May 7, 2020

(65) Prior Publication Data
US 2021/0404654 A1 Dec. 30, 2021

Related U.S. Application Data

(60) Provisional application No. 62/752,488, filed on Oct. 30, 2018.

(51) Int. Cl.
| F23D 14/22 | (2006.01) |
| C01B 3/36 | (2006.01) |
| F23D 14/32 | (2006.01) |
| F23D 14/58 | (2006.01) |

(52) U.S. Cl.
CPC ............ *F23D 14/22* (2013.01); *C01B 3/363* (2013.01); *F23D 14/32* (2013.01); *F23D 14/58* (2013.01); *F23D 2900/14641* (2013.01)

(58) Field of Classification Search
CPC .... C01B 2203/0216; C01B 2203/0255; C01B 3/36; C01B 3/363; F23D 14/22; F23D 14/32; F23D 14/58; F23D 2900/14641
See application file for complete search history.

(56) References Cited

U.S. PATENT DOCUMENTS

| 3,044,539 A * | 7/1962 | Keating ................. F23D 14/22 431/175 |
| 4,311,452 A * | 1/1982 | Begin ..................... F23D 14/22 431/352 |
| 5,490,775 A * | 2/1996 | Joshi ..................... F23D 14/22 431/187 |

(Continued)

FOREIGN PATENT DOCUMENTS

JP H09243028 A * 9/1997

*Primary Examiner* — Jorge A Pereiro
*Assistant Examiner* — Logan P Jones
(74) *Attorney, Agent, or Firm* — AdamsIP, LLC; Stephen Thompson; J. Hunter Adams

(57) ABSTRACT

In one embodiment, a burner for use in synthesis gas production includes multiple burner units each configured to deliver fuel and oxygen to a combustion chamber, each burner unit including an inner outlet pipe configured to deliver fuel and an outer outlet pipe configured to deliver oxygen, the outer outlet pipe concentrically surrounding the inner outlet pipe.

15 Claims, 5 Drawing Sheets

(56) References Cited

U.S. PATENT DOCUMENTS

| | | | | |
|---|---|---|---|---|
| 6,638,057 B2* | 10/2003 | Watson | ................... | F23D 14/22 |
| | | | | 431/174 |
| 2019/0092670 A1* | 3/2019 | Baker | ..................... | F23D 14/32 |

* cited by examiner

BURNERS FOR USE IN PRODUCING SYNTHESIS GAS

CROSS-REFERENCE TO RELATED APPLICATION

This application is a U.S. National Stage application of PCT Application Number PCT/US19/58899, filed on Oct. 30, 2019, which claims priority to U.S. Provisional Application Ser. No. 62/752,488, filed Oct. 30, 2018, which is hereby incorporated by reference herein in its entirety.

FIELD OF THE DISCLOSURE

The subject matter of the present disclosure refers generally to burners for use in combusting gases.

BACKGROUND

Synthesis gas, or syngas, is a gas mixture primarily comprising hydrogen ($H_2$) and carbon monoxide (CO) that can be used in various applications, including electricity generation and liquid fuel production. Syngas can be produced using a reactor in which a mixture of reactants, such as natural gas and oxygen, can be transformed into the syngas. Such a reactor typically comprises a burner, a combustion chamber, and a catalyst chamber. The burners used in reactors often comprise diffusion burners in which the reactants are mixed within the flame downstream of the burner outlet. In such cases, it is important that the burner provide the correct balance of reactants to ensure proper functioning of the reactor and, therefore, proper production of syngas having desired properties.

SUMMARY

In one aspect, a burner for use in producing syngas comprising hydrogen and carbon monoxide is provided. The burner comprises a plurality of burner units each comprising an inner pipe and an outer pipe concentrically surrounding the inner pipe. Each of the inner pipes is in fluid communication with and extends from a first plenum chamber, and each of the outer pipes is in fluid communication with and extends from a second plenum chamber. The first plenum chamber is preferably configured to deliver a fuel gas, which may be natural gas, to the inner pipes, and the second plenum chamber is preferably configured to deliver oxygen gas to the outer pipes. The burner may be used to deliver the fuel and oxygen to a combustion chamber of a reactor that produces syngas.

Each burner unit further comprises a flow restrictor configured to restrict flow of a first fluid, which is preferably the fuel gas, within the inner pipe and to restrict flow of a second fluid, which is preferably the oxygen gas, within the outer pipe. In a preferred embodiment, the flow restrictor comprises a central disk and first and second cylindrical members extending from opposing sides of the central disk. The central disk preferably includes a central portion having a plurality of inner openings extending through the central disk and a peripheral portion having a plurality of outer openings extending through the central disk. The first and second cylindrical members extending from opposing sides of the central disk each surround the central portion and the inner openings of the central disk. The peripheral portion and the outer openings of the central disk are outside of the first and second cylindrical members. The central disk of each flow restrictor preferably has an outer diameter that is approximately equal to an inner diameter of the outer pipe, and the cylindrical member of each flow restrictor preferably has an inner diameter that is approximately equal to an outer diameter of the inner pipe. An end of the inner pipe may be received within one of the cylindrical members.

In a preferred embodiment, the burner comprises a plurality of inner supply pipes each in fluid communication with and extending from the first plenum chamber, and a flow restrictor is mounted to an end of each one of the inner supply pipes. The burner may further comprise a plurality of inner outlet pipes, and an end of each inner outlet pipe may be connected to one of the flow restrictors so that each flow restrictor acts as a coupler that connects an inner supply pipe to an inner outlet pipe. The cylindrical members of each flow restrictor may have threaded inner surfaces corresponding to threaded outer surfaces of the inner supply pipes and inner outlet pipes so that the inner supply pipes and the inner outlet pipes may be threaded into the cylindrical members in order to connect both the inner supply pipes and the inner outlet pipes to a flow restrictor. A plurality of outer pipes are each in fluid communication with and extend from the second plenum chamber. An outer pipe concentrically surrounds an inner supply pipe and an inner outlet pipe connected to each other via a flow restrictor. Each outer pipe may preferably comprise an outer supply pipe that is in fluid communication with and extending from the second plenum chamber and an outer outlet pipe connected to the outer supply pipe. The outer outlet pipe may concentrically surround one flow restrictor that connects an inner supply pipe and an inner outlet pipe. The central portion of each flow restrictor may restrict flow of the first fluid from the first plenum chamber, through the inner supply pipe, and into the inner outlet pipe, and the peripheral portion may restrict flow of the second fluid from the second plenum chamber through the outer supply pipe and outer outlet pipe.

In another aspect, a flow restrictor is provided. The flow restrictor comprises a central disk having two opposing sides and first and second cylindrical members extending from the opposing sides of the central disk. The central disk includes a central portion having a plurality of inner openings extending through the central disk and a peripheral portion having a plurality of outer openings extending through the central disk. The first and second cylindrical members each surround the central portion and the inner openings of the central disk. The peripheral portion and the outer openings of the central disk are outside of the first and second cylindrical members. When installed on a burner, the inner openings are configured to restrict flow of a first fluid through a first flow path of the burner, and the outer openings are configured to restrict flow of a second fluid through a second flow path of the burner. Each of the cylindrical members may have a threaded inner surface for connecting to flow pipes of the burner.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Disclosed herein are burners suitable for use in producing synthesis gas (syngas). In some embodiments, the burners comprise diffusion burners that each include multiple burner units that are used in parallel. In such a case, the reactant flow speed and the reaction length required to complete the reaction are reduced as compared to systems comprising a single burner unit. Each of the burner units can include concentric pipes, including an inner pipe configured to deliver fuel and an outer pipe configured to deliver oxygen. In some embodiments, a flow restrictor is provided for each burner unit that controls both the flow of fuel and oxygen through their respective pipes. When such flow restrictors are used, the flow of reactants through the burner units is more balanced and more even flames can be produced.

In the following disclosure, various specific embodiments are described. It is to be understood that those embodiments are example implementations of the disclosed inventions and that alternative embodiments are possible. Such alternative embodiments include hybrid embodiments that combine aspects of different embodiments. All such embodiments are intended to fall within the scope of this disclosure.

Figure 1:
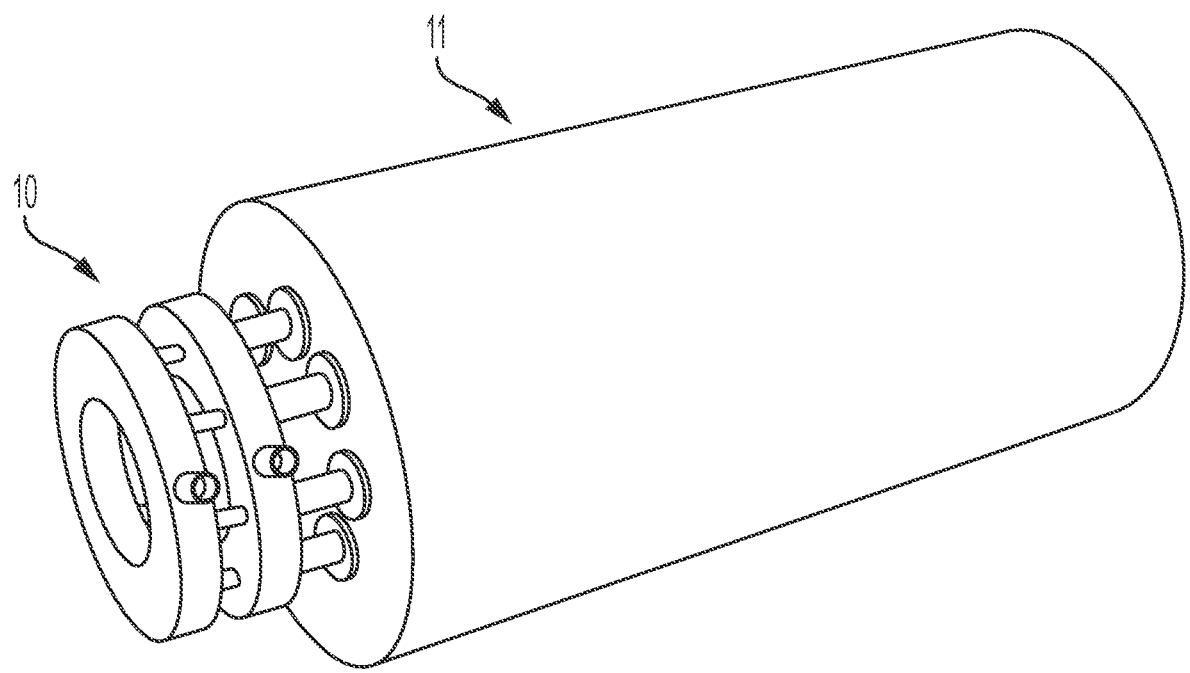
FIG. 1 is a perspective view illustrating an embodiment of a system comprising a burner mounted to a combustion chamber.

FIG. 1 illustrates part of a syngas production system that comprises a burner 10 that is mounted to a combustion chamber 11 of a syngas reactor. By way of example, the combustion chamber 11 can be approximately 5 to 30 feet in diameter (e.g., 6 feet). The burner 10 delivers reactants, which at least include fuel (e.g., natural gas) and oxygen to the combustion chamber 11 using multiple burner units. It is noted that, in the context of this document, delivery of "oxygen" is intended to cover the delivery of any gas that is at least 70 percent oxygen in composition. Accordingly, when it is stated herein that "oxygen" is delivered to, through, or from the burner 10, this includes cases in which pure oxygen is delivered as well as cases in which a gas comprising oxygen as well as one or more other types of gas, such as nitrogen, is delivered.

As described below, each burner unit can be configured as a diffusion burner unit in which the fuel and oxygen are mixed after exiting their respective flow pipes. In some embodiments, those flow pipes can be concentrically arranged with each other. For example, inner pipes of each burner unit can be used to deliver the fuel while the outer pipes of each burner unit (that surround the inner supply pipes) can be used to deliver the oxygen. The exit ends of the fuel and oxygen flow pipes (not visible in FIG. 1) are positioned within the combustion chamber 11.

During operation of the syngas production system, a reaction is initiated when the reactants exit the burner units and enter the combustion chamber 11, which can be heated to a temperature above the autoignition temperature for the mixture (e.g., 600° C.). When the temperature in the combustion chamber 11 is above the autoignition temperature, the mixture automatically ignites and reacts to form a mixture of hydrogen ($H_2$), carbon monoxide (CO), carbon dioxide ($CO_2$), water ($H_2O$), and unreacted methane ($CH_4$) (assuming natural gas and oxygen as reactants). Accordingly, unlike conventional burners, the burner 10 does not require, and therefore does not include, any ignition devices, such as spark generators. The combustion chamber 11 is lined with insulation to contain the heat released from the reaction and to provide a hot surface for the initiation of the reaction. The burner geometry and operating conditions are selected such that a desired $H_2$:CO molar ratio of syngas can be achieved. As an example, this molar ratio may be in the range of approximately 1.4 to 3.0.

Notably, steam can be mixed with the fuel to produce humidified fuel that gives the syngas product elevated partial pressures of $H_2O$ for subsequent reforming reactions. To achieve this, fuel and steam can be mixed upstream of the burner 10 in a static mixer. The steam temperature can be controlled such that the temperature of the humidified fuel is above the dew point, thus ensuring a single phase flowing into the burner. The inventors have determined that introducing steam into the syngas production system ensures stability and reproducibility in the reaction. In some embodiments, steam at temperatures in the range of approximately 150° C. to 350° C. can be delivered to a static mixer and can be used at ratios of 0 to 1.8 of steam to fuel mass flow with stable overall combustion performance (see FIG. 6).

Testing was performed to evaluate a single pipe-in-pipe burner having a diameter ratio of 2.0, a volume flow ratio of 0.6, and combustion chamber pressure of approximately 2 psig. Tables 1 and 2 present the results of this testing. The water data in Table 1 was obtained by mass-balance calculations and not actual measurements. The results confirm that the addition of steam to the fuel delivered to the burner resulted in increased production of $CO_2$, decreased production of CO, and an increase in the amount of unreacted methane as compared to the case without steam. Significantly, the syngas ratio also increased as the amount of steam increased.

TABLE 1

Outlet gas composition including water.

| steam to fuel mass flow ratio | $CO_2$ (mol %) | CO (mol %) | $H_2$ (mol %) | $CH_4$ (mol %) | $H_2O$ (mol %) | $H_2$:CO |
|---|---|---|---|---|---|---|
| 0 | 4.6 | 24.0 | 33.1 | 15.6 | 22.5 | 1.38 |
| 0.19 | 5.1 | 21.9 | 31.8 | 13.7 | 27.5 | 1.45 |
| 0.38 | 5.3 | 19.7 | 29.1 | 13.5 | 32.4 | 1.48 |
| 0.57 | 5.5 | 17.9 | 27.2 | 13.0 | 36.4 | 1.52 |

TABLE 2

Outlet gas composition excluding water.

| steam to fuel mass flow ratio | $CO_2$ (mol %) | CO (mol %) | $H_2$ (mol %) | $CH_4$ (mol %) | $H_2$:CO |
|---|---|---|---|---|---|
| 0 | 6.0 | 31.0 | 42.8 | 20.2 | 1.38 |
| 0.19 | 7.0 | 29.3 | 39.9 | 23.8 | 1.45 |
| 0.38 | 7.9 | 29.1 | 43.0 | 19.9 | 1.48 |
| 0.57 | 8.6 | 28.1 | 42.8 | 20.5 | 1.52 |

A flame was created using spark ignition for the cases listed in Tables 1 and 2. The heat of the flame provided the necessary temperature to sustain the reaction at the burner outlet as the fuel and oxygen continuously flowed. However, it was observed in some of the experiments that the reaction may continue even if the flame is extinguished due to the temperature of the chamber walls being above 600° C. Therefore, it is possible to start and sustain the partial oxidation reaction by introducing the mixture of fuel and oxygen into a combustion chamber that is at or above the autoignition temperature. Any method of heating the chamber walls to the required temperature can be used for this purpose. In this manner, the burner can operate without the need for a spark ignition system, which is commonly used in industry, and even operate without a flame present.

Figure 2:
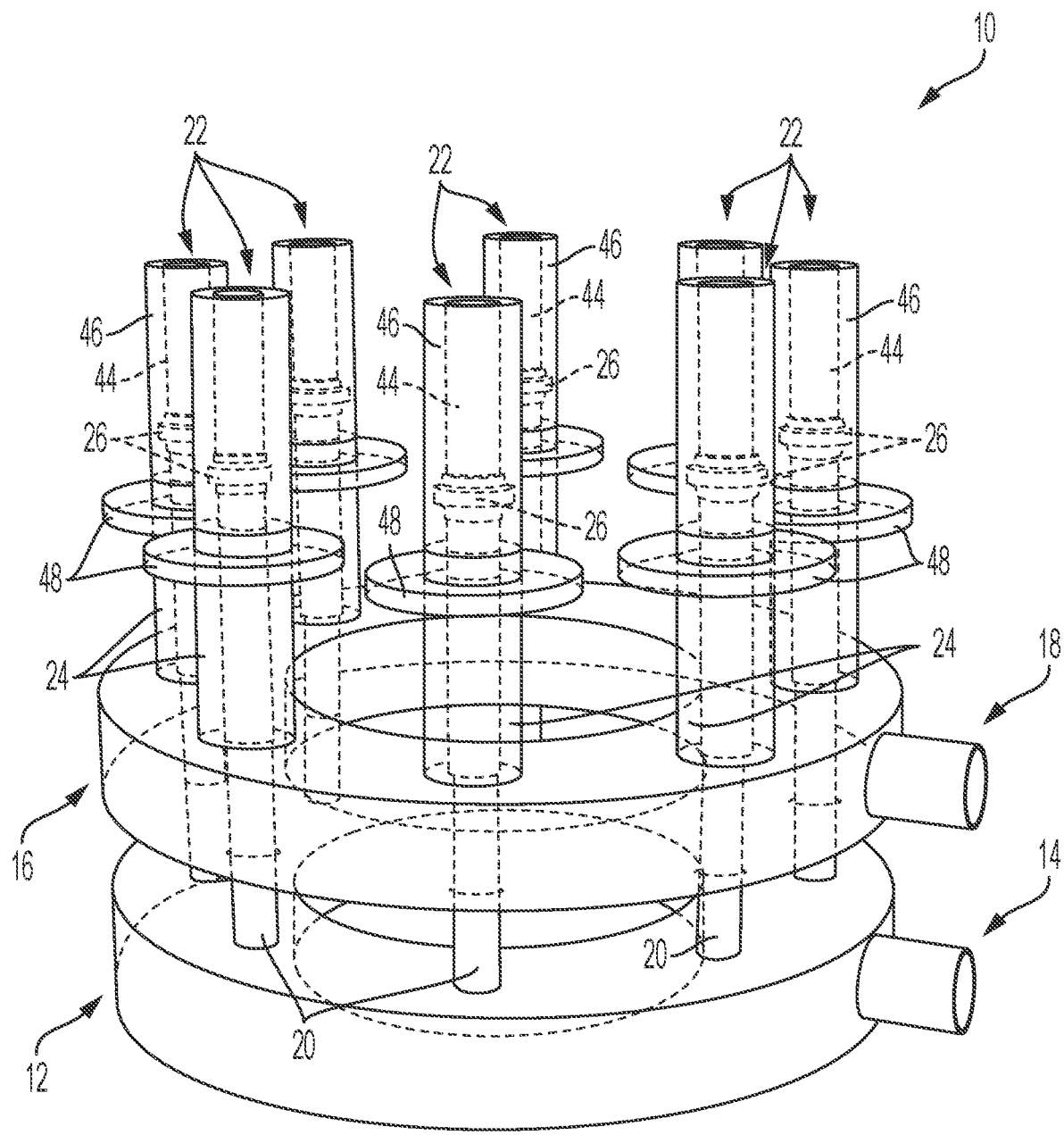
FIG. 2 is a perspective side view of an embodiment for the system comprising a burner shown in FIG. 1.
Figure 3:
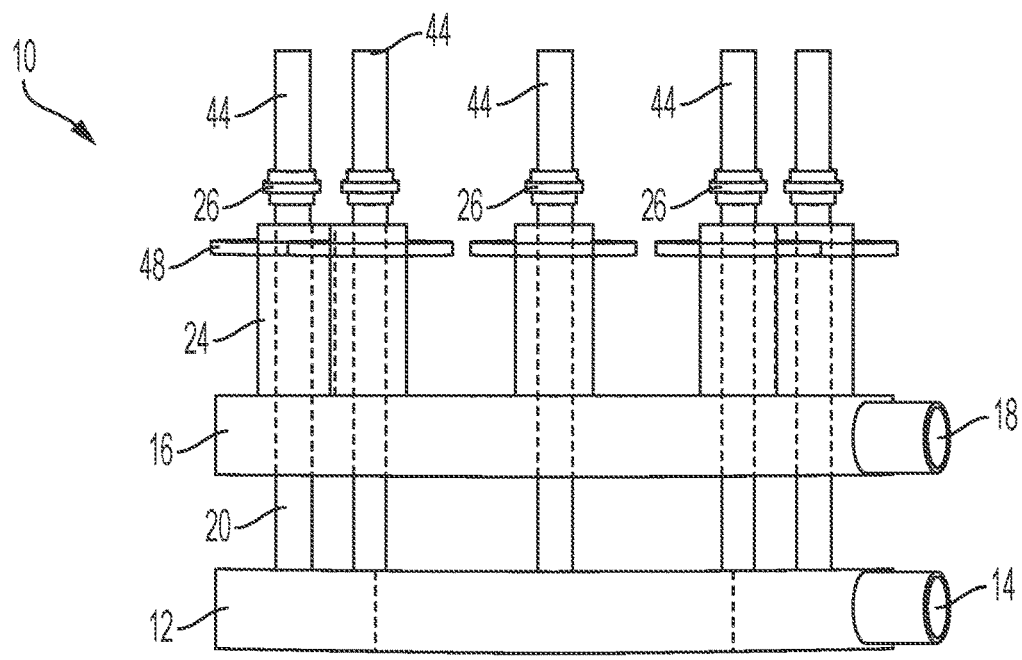
FIG. 3 is a side view of the burner of FIG. 2.
Figure 4:
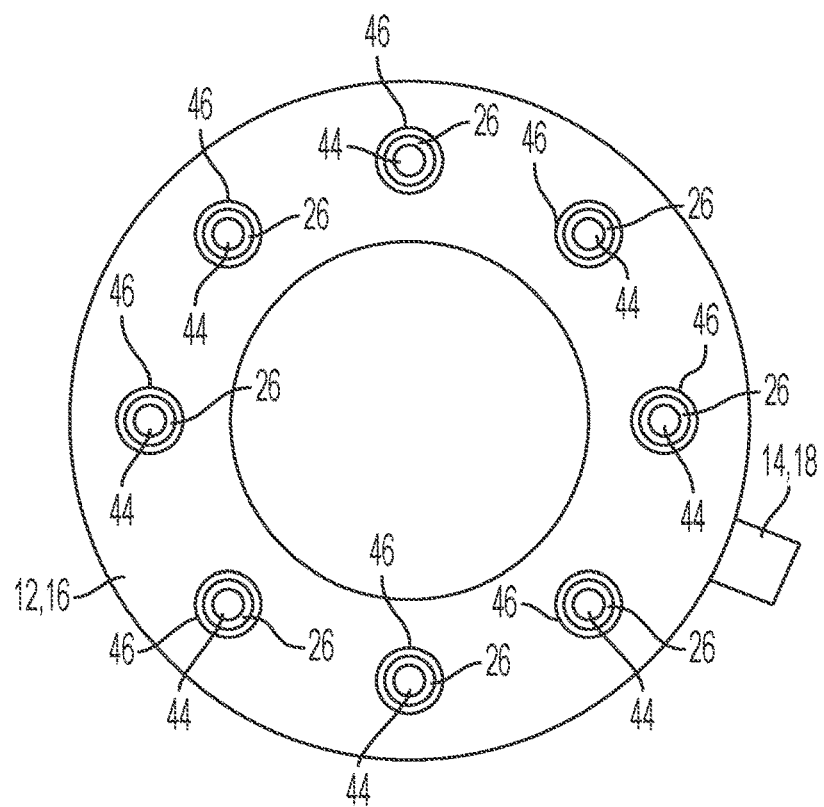
FIG. 4 is a plan view of the burner of FIGS. 2 and 3.

FIGS. 2-4 illustrate an example configuration for the burner 10 shown in FIG. 1, which is configured to deliver fuel, oxygen, and steam (mixed with the fuel) to a combustion chamber. By way of example, the burner 10 is a diffusion burner that is capable of delivering fuel at a rate of 3,382 lb./hr., oxygen at a rate of 3,624 lb./hr., and steam at a rate of 0-1000 lb./hr.

With reference first to FIG. 2, the burner 10 comprises a first plenum chamber 12 that is configured to receive humidified fuel via a first inlet 14 and a second plenum chamber 16 that is configured to receive oxygen via a second inlet 18. As shown in FIG. 2, each plenum chamber 12, 16 can be generally ring shaped and defines a hollow interior space. As is also shown in the figure, the plenum chambers 12, 16 are concentrically aligned and are arranged in a stacked and spaced configuration.

Extending from the first plenum chamber 12 toward the second plenum chamber 16 are multiple hollow inner supply pipes 20 that are in fluid communication with the interior space of the first plenum chamber. Accordingly, humidified fuel delivered to the first plenum chamber 12 via the first inlet 14 can flow into and through each of the inner supply pipes 20. In the illustrated example, there are eight such pipes 20, such that the burner 10 comprises eight separate diffusion burner units 22 from which humidified fuel and oxygen are output. It is noted, however, that a greater or a lesser number of burner units 22 can be used, if desired. For example, anywhere from 2 to 16 burner units 22 can be provided. As is apparent from FIG. 2, the inner supply pipes 20 are equally spaced from each other about the circumference of the first plenum chamber 12.

With further reference to FIG. 2, the inner supply pipes 20 extend through the second plenum chamber 16. Unlike as with the first plenum chamber 12, however, the inner supply pipes 20 are not in fluid communication with the interior space of the second plenum chamber 16 so that oxygen provided to the second plenum chamber via the second inlet 18 cannot flow into or through the inner supply pipes. Extending from the second plenum chamber 16 in a direction facing away from the first plenum chamber 12 are multiple hollow outer supply pipes 24 that are in fluid communication with the interior space of the second plenum chamber. Accordingly, oxygen delivered to the second plenum chamber 16 via the second inlet 18 can flow into and through each of the outer supply pipes 24. As is apparent in FIG. 2, each outer supply pipe 24 concentrically surrounds an inner supply pipe 20 so that there is an equal number of outer supply pipes as inner supply pipes (eight in the illustrated example).

With such a configuration, humidified fuel can flow through the inner supply pipes 20 while oxygen simultaneously flows through the outer supply pipes 24 (and around the inner supply pipes) in the same direction. In some embodiments, the diameter ratio for the outer supply pipes 24 to the inner supply pipes 20 is in the range of approximately 1.5:1 to 2:1, and the oxygen-to-fuel volume flow ratio for each burner unit 22 is in the range of approximately 0.55 to 0.65. Ratios in these ranges result in flow velocities that create instability in the flow of the reactants that enhances mixing and results in a CO-rich syngas product. In some embodiments, the flow ratio further results in partial consumption of the fuel but complete consumption of the oxygen (i.e., a partial oxidation reaction). By way of example, each inner supply pipe 20 can have an outer diameter of approximately 1 to 6 inches (e.g., 2 inches) and each outer supply pipe 24 can have an outer diameter of approximately 2 to 12 inches (e.g., 4 inches). Each of the inner and outer supply pipes 20, 24 can be made of steel.

Figure 5A:
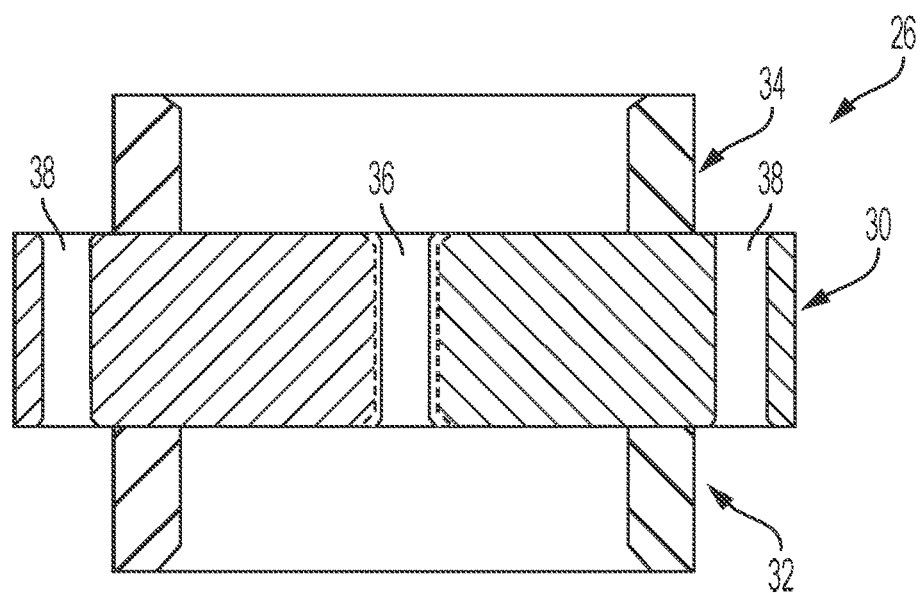
FIG. 5A is a cross-sectional side view of the flow restrictor of FIG. 5B.
Figure 5B:
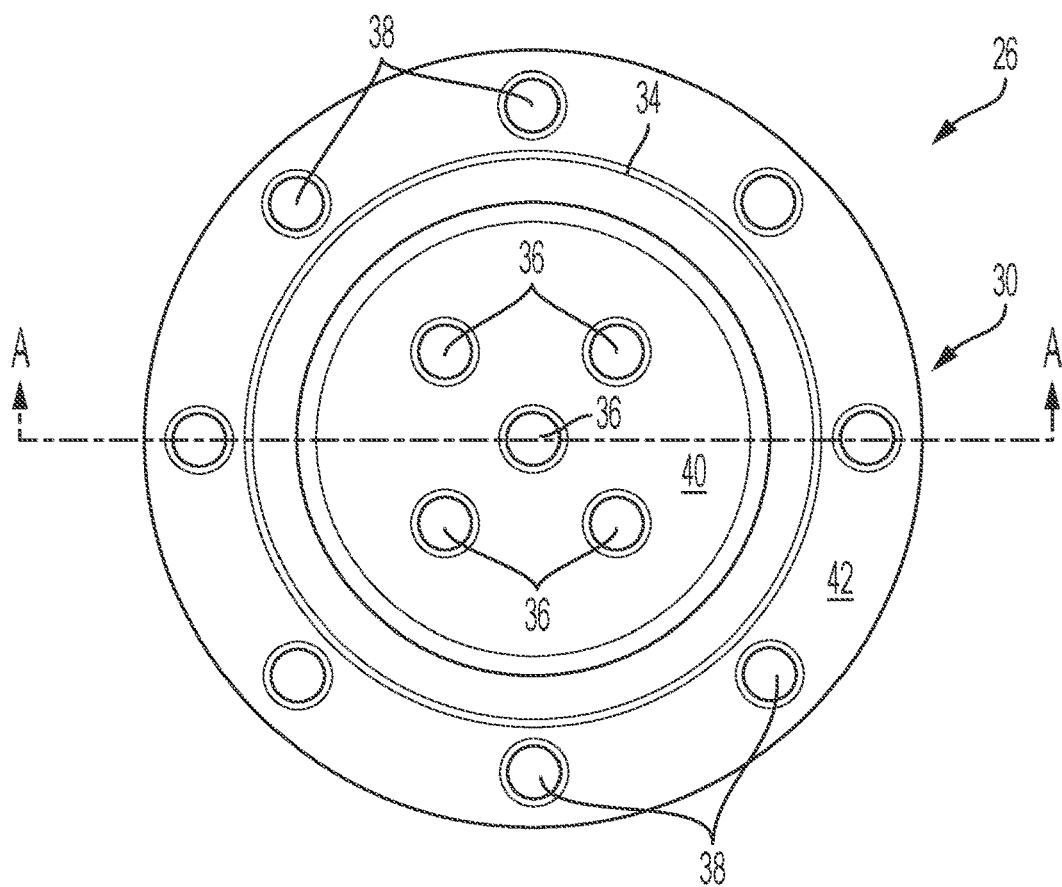
FIG. 5B is an end view of an embodiment of a flow restrictor used in the burner of FIGS. 2-4.

As depicted in FIGS. 2 and 3, mounted to the free end of each inner supply pipe 20 downstream of the second plenum chamber 16 is a flow restrictor 26 that is used to balance the flow of reactants through each burner unit 22. An example flow restrictor 26 is shown in FIGS. 5A and 5B. As shown in these figures, the flow restrictor 26 comprises a circular central disk 30 and first and second cylindrical members 32 and 34 that extend in opposite directions from opposite sides of the central disk. As shown most clearly in FIG. 5B, the central disk 30 comprises multiple inner openings 36 (5 openings in the example of FIG. 5) and multiple outer openings 38 (8 openings in the example of FIG. 5). The inner openings 36 extend through a central portion 40 of the disk 30 that is surrounded by the cylindrical members 32, 34, while the outer openings 38 extend through a peripheral portion 42 of the disk that is outside of the cylindrical members.

With reference back to FIGS. 2 and 3, the first cylindrical member 32 has an inner diameter that is approximately the same dimension as the outer diameter of the inner supply pipes 20 and, therefore, is configured to receive the free end of an inner supply pipe. In some embodiments, the inner surfaces of the first cylindrical members 32 and the free ends of the inner supply pipes 20 are threaded such that each flow restrictor 26 can be threaded onto the free end of an inner supply pipe. As is also shown in FIG. 3, received within each second cylindrical member 34 of each flow restrictor 26 is inner outlet pipe 44 that also delivers humidified fuel. Accordingly, the flow restrictors 26 act as couplers that each connect an inner supply pipe 20 to an inner outlet pipe 44. The inner surface of each second cylindrical member 34 as well as the proximal end of each inner outlet pipe 44 can be threaded such that, like the inner supply pipes 20, each inner outlet pipe can be threaded into a flow restrictor 26. Each inner outlet pipe 44 forms part of the outlet of the associated burner unit 22 and, therefore, is positioned near the flame produced by the burner unit 22. Because of this, each inner outlet pipe 44 can be made of a suitable high-temperature material, such as a ceramic material.

With reference again to FIG. 2, the outer supply pipes 24 have free ends that terminate upstream of the flow restrictors 26. Extending from those free ends are outer outlet pipes 46 that surround the inner outlet pipes 44 and also form part of the outlet of the associated burner unit 22. In some embodiments, the outer outlet pipes 46 connect to the outer supply pipes 24 with a threaded flange, which is described below. Like the inner outlet pipes 44, the outer outlet pipes 46 can be made of a suitable high-temperature material, such as a ceramic material. The central disk 30 of each flow restrictor 26 has an outer diameter that is approximately the same dimension as the inner diameter of the outer outlet pipes 44.

Therefore, as shown in FIG. 2, each outer outlet pipe 46 can be passed over both an inner outlet pipe 44 and its associated flow restrictor 26 with little to no space between the edges of the central disk 30 and the inner surfaces of the outer outlet pipe.

The above-described configuration of the first plenum chamber 12, inner supply pipes 20, flow restrictors 26, and inner outlet pipes 44 results in a first (fuel) flow path that enables humidified fuel delivered to the first plenum chamber to flow through the inner supply pipes, through the inner openings 36 of the flow restrictors (FIG. 5A), and through the inner outlet pipes into the combustion chamber. In similar manner, the above-described configuration of the second plenum chamber 16, the outer supply pipes 24, the flow restrictors 26, and the outer outlet pipes 46 results in a second (oxygen) flow path that enables oxygen delivered to the second plenum chamber to flow through the outer supply pipes, through the outer openings 38 of the flow restrictors (FIG. 5A), and through the outer outlet pipes into the combustion chamber. The fuel and oxygen mix with each other downstream of the exit ends of the outlet pipes 44, 46 within the combustion chamber and ignite.

The flow restrictors 26 play a significant role in producing the desired syngas. Specifically, the flow restrictors 26 build pressure within both the fuel and oxygen flow paths upstream of the flow restrictors (i.e., within the inner and outer supply pipes 20, 24) that balances the flow of the humidified fuel and oxygen across the various burner units 22. The size and number of the openings 36, 38 formed within the flow restrictors 26 can be varied to obtain a desired pressure and, therefore, the desired balancing. As an example, the five inner openings 36 can each have a diameter of approximately 5/16 in., and the eight outer openings 38 can each have a diameter of approximately ¼ in. The appropriate sizes and numbers of the inner openings 36 and the outer openings 38 can be determined on a case-by-case basis with consideration of the particular needs of the application. Generally speaking, however, the number of inner openings 36 can range from approximately 2 to 64 and their diameters can range from approximately 1/16 to ½ inches, and the number of outer openings 38 can range from approximately 2 to 64 and their diameters can range from approximately ½ to ¾ inches. Computer simulations have shown that the flow rate varies less than 3% from burner unit 22 to burner unit 22 with these dimensions and the flow restrictor geometry shown in FIGS. 5A and 5B. In addition to restricting and balancing reactant flows, use of the flow restrictors 26 enables replacement of the inner outlet pipes 44, when necessary, and maintains the alignments between the various concentric pipes.

With reference next to FIGS. 2 and 3, the burner 10 further includes mounting flanges 48 that facilitate mounting of the burner to the combustion chamber 11 (see FIG. 1). In addition, the flanges 48 can be threaded so as to facilitate connection of the outer supply pipes 24 and the outer outlet pipes 46.

The above-described burner 10 provides benefits that are not provided by conventional burners that only include a single burner unit. By operating multiple burner units 22 in parallel, the overall flow speed and hence reaction length (i.e., the length required to complete the reaction) is reduced as compared to when a single burner unit is used. Computer simulations have predicted the reaction length for the burner 10 is approximately 9 feet for a flow rate of 3,382 lb/hr for fuel and 3,624 lb/hr for oxygen (volume flow ratio of 0.6) through the burner. Notably, the reaction length for a single burner unit at this flow rate would be over 60 ft.

Figure 6:
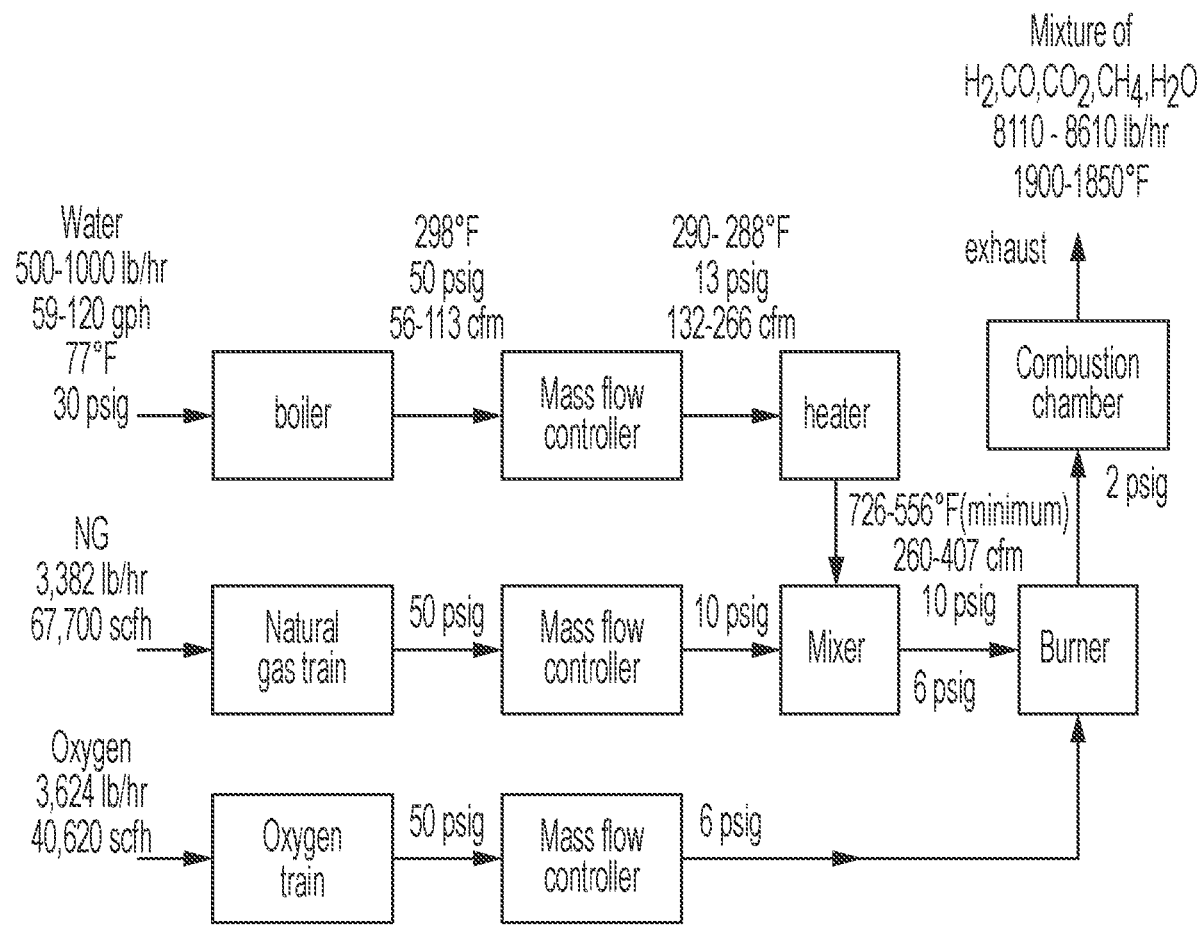
FIG. 6 is a block diagram of an embodiment of an experimental system for producing syngas in which a burner similar to that shown in FIGS. 2-4 was used.

An experimental gas and steam supply system was designed to perform testing of a burner having a configuration similar to the burner 10 described above. FIG. 6 illustrates the primary components, the mass balance, and process conditions for this experimental system. The steam flow controller did not maintain a consistent flow of steam during the testing, so useful data regarding the burner performance with steam was not collected. However, data for burner operation without steam was collected. The results are shown in Table 3. The time-averaged input flow rates for oxygen and natural gas were 753 kg/hr and 625 kg/h, respectively (an average volume ratio of 0.56). The results show that the burner 10 generates syngas with a ratio less than 2.0 while achieving lower levels of $CO_2$ and $CH_4$, as compared to a conventional burner.

TABLE 3

| | Outlet gas composition including water. | | | | | |
|---|---|---|---|---|---|---|
| steam to fuel mass flow ratio | $CO_2$ (mol %) | CO (mol %) | $H_2$ (mol %) | $CH_4$ (mol %) | $H_2O$ (mol %) | $H_2$:CO |
| 0 | 4.0 | 27.7 | 51.8 | 6.5 | 10.1 | 1.87 |

The invention claimed is:

1. A burner comprising a plurality of burner units,
wherein each burner unit comprises an inner pipe and an outer pipe concentrically surrounding the inner pipe,
wherein each burner unit further comprises a flow restrictor configured to restrict flow of a first fluid within the inner pipe and to restrict flow of a second fluid within the outer pipe,
wherein the flow restrictor comprises a central disk and a cylindrical member extending from one side of the central disk, wherein an end of the inner pipe is received within the cylindrical member,
wherein the central disk of the flow restrictor includes a central portion and a peripheral portion, wherein the central portion is configured to restrict flow of the first fluid within the inner pipe that is received within the cylindrical member of the flow restrictor, and wherein the peripheral portion is configured to restrict flow of the second fluid within the outer pipe surrounding the inner pipe, and
wherein the central portion of the central disk has a plurality of inner openings extending through the central disk and the peripheral portion of the central disk has a plurality of outer openings extending through the central disk.

2. The burner of claim 1, wherein each burner unit is configured to deliver fuel and oxygen to a combustion chamber, wherein the first fluid comprises fuel and the second fluid comprises oxygen.

3. The burner of claim 1, wherein the central disk of the flow restrictor has an outer diameter that is approximately equal to an inner diameter of the outer pipe, and wherein the cylindrical member of the flow restrictor has an inner diameter that is approximately equal to an outer diameter of the inner pipe.

4. The burner of claim 1, wherein the cylindrical member has a threaded inner surface and the end of the inner pipe has a threaded outer surface, wherein the end of the inner pipe is threaded into the cylindrical member.

5. The burner of claim 1, further comprising a first plenum chamber and a second plenum chamber, wherein each inner pipe is in fluid communication with and extends from the first plenum chamber, wherein each outer pipe is in fluid communication with and extends from the second plenum chamber.

6. The burner of claim 1, wherein the outer pipe and the inner pipe have a diameter ratio in the range of approximately 1.5:1 to 2:1.

7. A burner, comprising:
a first plenum chamber and a second plenum chamber;
a plurality of inner supply pipes each in fluid communication with and extending from the first plenum chamber;
a plurality of outer pipes each in fluid communication with and extending from the second plenum chamber;
a plurality of flow restrictors, wherein each respective flow restrictor is mounted to an end of one of the inner supply pipes, wherein each flow restrictor comprises a central disk that includes a central portion and a peripheral portion, wherein the central portion of the central disk has a plurality of inner openings extending through the central disk and the peripheral portion of the central disk has a plurality of outer openings extending through the central disk; and
a plurality of inner outlet pipes, wherein an end of each respective inner outlet pipe is connected to one of the flow restrictors,
wherein each respective outer pipe concentrically surrounds one inner supply pipe and one inner outlet pipe,
wherein the central portion of each flow restrictor is configured to restrict flow of a first fluid from the first plenum chamber, through the inner supply pipe to which the respective flow restrictor is mounted, and into the inner outlet pipe that is connected to the respective flow restrictor, and wherein the peripheral portion is configured to restrict flow of a second fluid from the second plenum chamber through the outer pipe surrounding the inner supply pipe to which the respective flow restrictor is mounted and the inner outlet pipe that is connected to the respective flow restrictor.

8. The burner of claim 7, wherein each flow restrictor further comprises first and second cylindrical members extending from opposing sides of the central disk, wherein the end of one respective inner supply pipe is received in the first cylindrical member, and the end of one respective inner outlet pipe is received in the second cylindrical member.

9. The burner of claim 8, wherein the first and second cylindrical members each have threaded inner surfaces that correspond to threaded outer surfaces of the end of each inner supply pipe and the end of each inner outlet pipe, wherein the end of each respective inner supply pipe is threaded into one respective first cylindrical member and the end of each respective inner outlet pipe is threaded into one respective second cylindrical member.

10. The burner of claim 8, wherein the first and second cylindrical members each surround the central portion and the inner openings of the central disk, wherein the peripheral portion and the outer openings of the central disk are outside of the first and second cylindrical members.

11. The burner of claim 8, wherein the central disk has an outer diameter that is approximately equal to an inner diameter of the outer pipe surrounding the inner supply pipe to which the respective flow restrictor is mounted and the inner outlet pipe connected to the respective flow restrictor, wherein the first cylindrical member has an inner diameter that is approximately equal to an outer diameter of the inner supply pipe to which the respective flow restrictor is mounted, and wherein the second cylindrical member has an inner diameter that is approximately equal to an outer diameter of the inner outlet pipe connected to the respective flow restrictor.

12. The burner of claim 11, wherein each outer pipe comprises an outer supply pipe in fluid communication with and extending from the second plenum chamber and an outer outlet pipe connected to the outer supply pipe, wherein each outer outlet pipe concentrically surrounds one respective flow restrictor, wherein the central disk has an outer diameter that is approximately equal to an inner diameter of the outer outlet pipe.

13. The burner of claim 7, wherein each outer pipe comprises an outer supply pipe in fluid communication with and extending from the second plenum chamber and an outer outlet pipe connected to the outer supply pipe, wherein each outer outlet pipe concentrically surrounds one respective flow restrictor.

14. The burner of claim 7, wherein the burner is configured to deliver fuel and oxygen to a combustion chamber, wherein the first fluid comprises fuel and the second fluid comprises oxygen.

15. The burner of claim 7, wherein the outer pipe and the inner supply pipe have a diameter ratio in the range of approximately 1.5:1 to 2:1, and wherein the inner supply pipe and the inner outlet pipe have the same diameter.

* * * * *